US012566910B2

(12) United States Patent
Zhang et al.

(10) Patent No.: US 12,566,910 B2
(45) Date of Patent: Mar. 3, 2026

(54) ALGORITHMIC CIRCUIT DESIGN AUTOMATION

(71) Applicants:INTERNATIONAL BUSINESS MACHINES CORPORATION, Armonk, NY (US); New Jersey Institute of Technology, Newark, NJ (US)

(72) Inventors: Shun Zhang, San Mateo, CA (US); Xin Zhang, Chappaqua, NY (US); Shaoze Fan, East Newark, NJ (US); Ningyuan Cao, Countryside, IL (US); Jing Li, Clifton, NJ (US); Xiaoxiao Guo, Mountain View, CA (US); Chuang Gan, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

(21) Appl. No.: 17/932,538

(22) Filed: Sep. 15, 2022

(65) Prior Publication Data

US 2024/0095435 A1      Mar. 21, 2024

(51) Int. Cl.
*G06F 30/398*          (2020.01)
*G06F 30/27*           (2020.01)
          (Continued)

(52) U.S. Cl.
CPC ............ *G06F 30/398* (2020.01); *G06F 30/27* (2020.01); *G06F 30/323* (2020.01);
          (Continued)

(58) Field of Classification Search
CPC .... G06F 30/398; G06F 30/367; G06F 30/373; G06F 30/337; G06F 30/3308; G06F 30/327; G06F 30/323; G06F 30/27
          (Continued)

(56) References Cited

U.S. PATENT DOCUMENTS 5,084,824 A      1/1992  Lam
8,473,885 B2     6/2013  Cohn
          (Continued)

FOREIGN PATENT DOCUMENTS

CA          2408705 A1 *  4/2003  ............. G06F 30/30
CA          2631559 A1 * 11/2009  ............. G06F 30/36
          (Continued)

OTHER PUBLICATIONS

Awais, et al., "An MCTS-Based Framework for Synthesis of Approximate Circuits," IEEE, 2018, pp. 219-224.
          (Continued)

*Primary Examiner* — Phallaka Kik
(74) *Attorney, Agent, or Firm* — Rakesh Roy

(57)          ABSTRACT

A method, system, and computer program product for circuit design automation. The method identifies a set of circuit components for a proposed circuit design. A subset of circuit components is selected to generate an initial topology for the proposed circuit design. A set of subsequent topologies are iteratively generated by a heuristic search algorithm based on the subset of circuit components and the initial topology. A set of valid topologies of the set of subsequent topologies are determined by a circuit simulator based on the subset of circuit components and a set of connections within the set of subsequent topologies. The method generates the proposed circuit design from the set of valid topologies.

20 Claims, 5 Drawing Sheets

(51) Int. Cl.

| | |
|---|---|
| *G06F 30/323* | (2020.01) |
| *G06F 30/327* | (2020.01) |
| *G06F 30/3308* | (2020.01) |
| *G06F 30/337* | (2020.01) |
| *G06F 30/367* | (2020.01) |
| *G06F 30/373* | (2020.01) |
| *G06F 119/02* | (2020.01) |

(52) U.S. Cl.
CPC ........ *G06F 30/327* (2020.01); *G06F 30/3308* (2020.01); *G06F 30/337* (2020.01); *G06F 30/367* (2020.01); *G06F 30/373* (2020.01); *G06F 2119/02* (2020.01)

(58) Field of Classification Search
USPC .......... 716/105, 106, 111, 132, 136; 703/15
See application file for complete search history.

(56) References Cited

U.S. PATENT DOCUMENTS

| | | | | |
|---|---|---|---|---|
| 9,846,753 | B2 | 12/2017 | Lee | |
| 10,380,297 | B2 | 8/2019 | Sendig | |
| 10,409,938 | B2 | 9/2019 | Foreman | |
| 10,528,644 | B1 | 1/2020 | Zhang | |
| 10,678,981 | B2 * | 6/2020 | Ankenapalli | G06F 30/327 |
| 10,706,195 | B1 * | 7/2020 | Rezende Barbosa | |
| | | | | G06F 30/3323 |
| 10,776,548 | B1 | 9/2020 | Liu | |
| 10,872,192 | B1 * | 12/2020 | Ginetti | G06F 30/367 |
| 10,909,293 | B1 | 2/2021 | Zhang | |
| 11,120,358 | B2 | 9/2021 | Horesh | |
| 11,126,772 | B1 * | 9/2021 | Manna | G06F 30/36 |
| 11,132,485 | B2 | 9/2021 | Landman | |
| 2002/0032894 | A1 * | 3/2002 | Miyazaki | G06F 30/30 |
| | | | | 716/105 |
| 2003/0079188 | A1 * | 4/2003 | McConaghy | G06F 30/36 |
| | | | | 716/135 |
| 2004/0103263 | A1 * | 5/2004 | Colavin | G06F 15/8007 |
| | | | | 712/E9.046 |
| 2011/0154275 | A1 * | 6/2011 | Hambardzumyan | |
| | | | | G06F 30/398 |
| | | | | 716/139 |
| 2013/0139119 | A1 * | 5/2013 | Hidvegi | G06F 30/331 |
| | | | | 716/111 |
| 2016/0232268 | A1 * | 8/2016 | Rajagopalan | G06F 30/367 |
| 2019/0034563 | A1 * | 1/2019 | Ankenapalli | G06F 30/327 |
| 2020/0090072 | A1 | 3/2020 | Troyer | |
| 2020/0151295 | A1 | 5/2020 | Chen | |
| 2020/0401925 | A1 | 12/2020 | Hertzberg | |
| 2021/0056468 | A1 | 2/2021 | Cao | |
| 2021/0278825 | A1 | 9/2021 | Wen | |
| 2021/0397770 | A1 * | 12/2021 | Bompard | G06N 5/01 |
| 2022/0092240 | A1 * | 3/2022 | Chi | G06F 30/17 |

FOREIGN PATENT DOCUMENTS

| | | | | |
|---|---|---|---|---|
| WO | WO-9966432 A1 * | 12/1999 | ............. | G06F 30/30 |
| WO | WO-2009151934 A1 * | 12/2009 | ............. | G06F 30/30 |

OTHER PUBLICATIONS

Meng et al.; "Advanced Ordering Search for Multi-Level Approximate Logic Synthesis", IWLS 28th International Workshop, Jun. 21-23, 2019, 8 pages.

Mirhoseini, et al., "A graph placement methodology for fast chip design," Nature, Jun. 10, 2021, 23 pages, vol. 594.

Sinha et al., "Qubit Routing Using Graph Neural Network Aided Monte Carlo Tree Search," arXiv:2104.01992v1, Apr. 1, 2021, 10 pages.

Witschen qt al., "CIRCA: Towards a Modular and Extensible Framework for Approximate Circuit Generation," Microelectronics Reliability, 2019, 14 pages.

Zhou et al., "Supervised Learning Enhanced Quantum Circuit Transformation," arXiv:20110.03057v1, Oct. 6, 2021, 9 pages.

\* cited by examiner

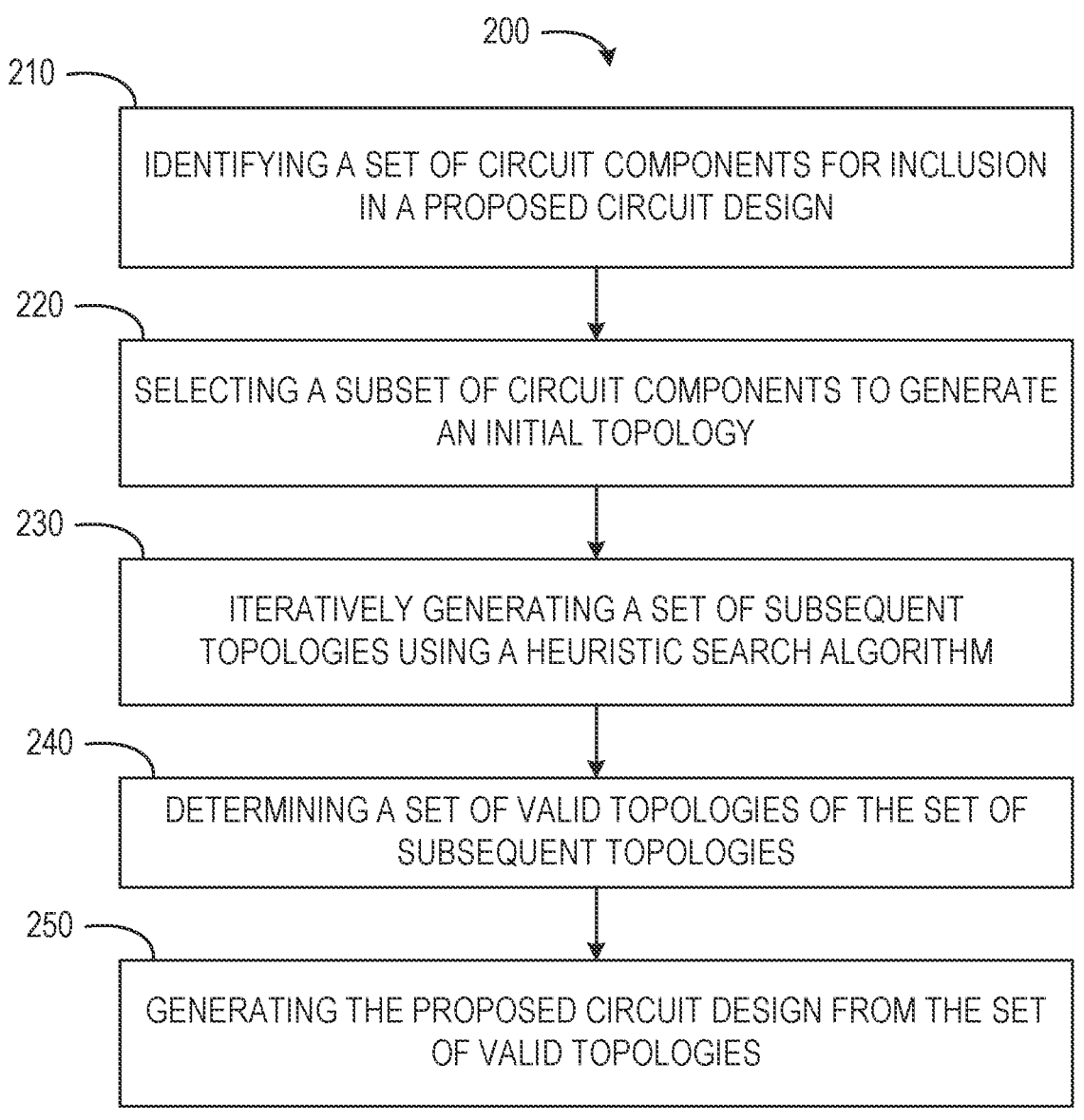

200

210 IDENTIFYING A SET OF CIRCUIT COMPONENTS FOR INCLUSION IN A PROPOSED CIRCUIT DESIGN

220 SELECTING A SUBSET OF CIRCUIT COMPONENTS TO GENERATE AN INITIAL TOPOLOGY

230 ITERATIVELY GENERATING A SET OF SUBSEQUENT TOPOLOGIES USING A HEURISTIC SEARCH ALGORITHM

240 DETERMINING A SET OF VALID TOPOLOGIES OF THE SET OF SUBSEQUENT TOPOLOGIES

250 GENERATING THE PROPOSED CIRCUIT DESIGN FROM THE SET OF VALID TOPOLOGIES

ALGORITHMIC CIRCUIT DESIGN AUTOMATION

This invention was made with Government support under contract number DE-AR0001210 awarded by the U.S. Department of Energy. The Government has certain rights in this invention.

BACKGROUND

Circuits are often designed using methods relying on expert knowledge. Often engineers initially select a circuit topology and use a combination of intuition and mathematical equations to estimate or simulate circuit function prior to arriving at a final design. Similarly, current methodology for designing integrated circuits using software often include circuit stencils selected from a circuit stencil database, other existing circuit libraries, or previously cached results as a starting point for circuit design. Current circuit design methodologies often employ engineers to design circuits or portions of circuits to perform specific functions or provide outputs within a specified range. Large circuits are often designed in sections. These circuit design methods often predetermine possible components or connected components to be added to the circuit. These methods constrain a space of a circuit that can be found based on initially selected topologies, possible components, and connected components.

SUMMARY

According to an embodiment described herein, a computer-implemented method for circuit design automation. The method identifies a set of circuit components for a proposed circuit design. A subset of circuit components is selected to generate an initial topology for the proposed circuit design. A set of subsequent topologies are iteratively generated by a heuristic search algorithm based on the subset of circuit components and the initial topology. A set of valid topologies of the set of subsequent topologies are determined by a circuit simulator based on the subset of circuit components and a set of connections within the set of subsequent topologies. The methods generates the proposed circuit design from the set of valid topologies.

According to an embodiment described herein, a system for circuit design automation is provided. The system includes one or more processors and a computer-readable storage medium, coupled to the one or more processors, storing program instructions that, when executed by the one or more processors, cause the one or more processors to perform operations. The operations identify a set of circuit components for a proposed circuit design. A subset of circuit components is selected to generate an initial topology for the proposed circuit design. A set of subsequent topologies are iteratively generated by a heuristic search algorithm based on the subset of circuit components and the initial topology. A set of valid topologies of the set of subsequent topologies are determined by a circuit simulator based on the subset of circuit components and a set of connections within the set of subsequent topologies. The operations generate the proposed circuit design from the set of valid topologies.

According to an embodiment described herein, a computer program product for circuit design automation is provided. The computer program product includes a computer-readable storage medium having program instructions embodied therewith, the program instructions being executable by one or more processors to cause the one or more processors to identify a set of circuit components for a proposed circuit design. A subset of circuit components is selected to generate an initial topology for the proposed circuit design. A set of subsequent topologies are iteratively generated by a heuristic search algorithm based on the subset of circuit components and the initial topology. A set of valid topologies of the set of subsequent topologies are determined by a circuit simulator based on the subset of circuit components and a set of connections within the set of subsequent topologies. The computer program product generates the proposed circuit design from the set of valid topologies.

BRIEF DESCRIPTION OF THE DRAWINGS

FIG. 2 depicts a flow diagram of a computer-implemented method for circuit design automation, according to at least one embodiment.

DETAILED DESCRIPTION

Figure 1:
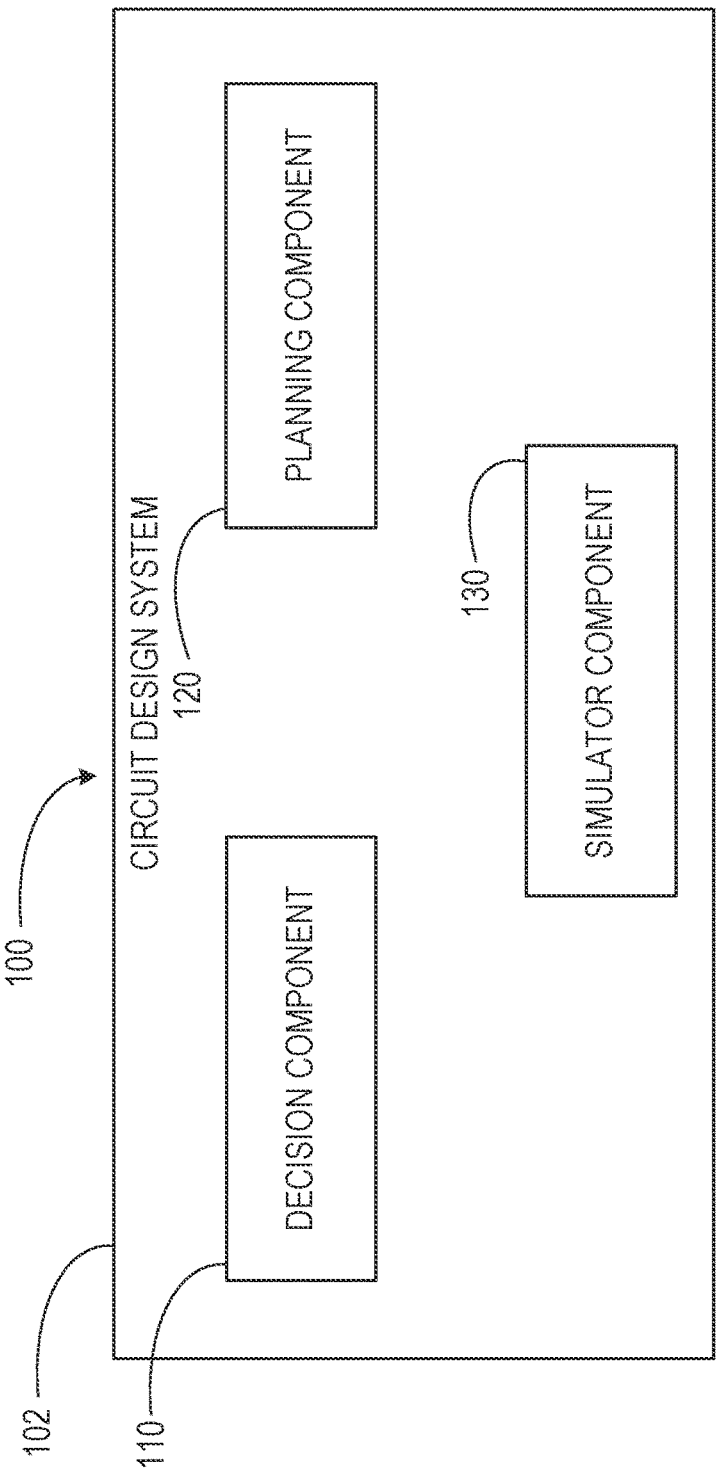
FIG. 1 depicts a block diagram of a computing environment for implementing concepts and computer-based methods, according to at least one embodiment.

The present disclosure relates generally to methods for circuit design automation. More particularly, but not exclusively, embodiments of the present disclosure relate to a computer-implemented method for Monte Carlo tree search-based algorithmic circuit design automation. The present disclosure relates further to a related system for circuit design automation, and a computer program product for operating such a system.

Current circuit design methodologies often use expert knowledge, with engineers engaging in design using intuition, mathematical equations, and simulation practices on predetermined topologies. Electronic topology design seeks to find high-performance electrical circuits within a large circuit space. Current methodologies often segment large circuits into smaller sections for individual design, later being combined to determine interoperability and compatibility. Current methodologies are impractical for designing and evaluating electronic circuits in a large circuit space. Due to computational inefficiencies and impracticalities in approach, current methods rely heavily on individual expertise of engineers and are ill-suited to automation.

Some current circuit design methodologies incorporate software or algorithmic elements into software design. These methodologies often incorporate preexisting circuit elements as a starting point for circuit design. For example, some circuit design methodologies use instantiations of circuit stencils selected from circuit stencil databases. Such methodologies incorporate circuit stencils as abstracted versions of circuit segments. Some circuit design methodologies incorporate existing overlay or macrocell libraries as a basis for design layouts. Some circuit design methodologies selectively replace portions of a circuit design with previously cached results in effort to improve design efficiency.

Such circuit design methods are rule-based circuit design methods with preexisting rules provided to guide the software assisted design.

The present disclosure provides a framework for circuit design automation, improving computational efficiency and practicality of algorithmic circuit design automation. Some embodiments of the present disclosure enable heuristic or tree-search algorithmic frameworks that identify high-performance circuit designs. Embodiments of the present disclosure, using algorithmic frameworks for circuit design, increase efficiency and accuracy of circuit design over conventional methods. Some embodiments of the present disclosure enable combination of algorithmic circuit design with expert knowledge and offline data to improve algorithmic performance in automated circuit design. Embodiments of the present disclosure enable circuit design automation without employing preexisting libraries, previously cached circuit portions, or preexisting rules. The present disclosure provides circuit design automation capable of determining where circuit components are to be placed, which circuit components to add, and topological connections between components added to prospective circuits.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a circuit design system 102. The circuit design system 102 may comprise a decision component 110, a planning component 120, and a simulator component 130. The decision component 110 identifies and selects a subset of circuit components for a proposed circuit design. The planning component 120 iteratively generates topologies based on selected circuit components and an initial topology.

The simulator component 130 determines valid topologies of a set of iteratively generated topologies. Although described with distinct components, it should be understood that, in at least some embodiments, components may be combined or divided, and/or additional components may be added without departing from the scope of the present disclosure.

Referring now to FIG. 2, a flow diagram of a computer-implemented method 200 is shown. The computer-implemented method 200 is a method for circuit design automation. In some embodiments, the computer-implemented method 200 may be performed by one or more components of the computing environment 100, as described in more detail below.

At operation 210, the decision component 110 identifies a set of circuit components. The set of circuit components are identified as potential components for inclusion in a proposed circuit design. The decision component 110 may be provided with input and output metrics or characteristics for a circuit to be designed. The input and output metrics or characteristics may be elements or aspects of a system or circuit into which the proposed circuit is to fit. The set of circuit components may be circuit components suitable for inclusion within the system or circuit. For example, the circuit components may include field-effect transistors, inductors, capacitors, combinations thereof, and any other suitable circuit components. In such instances, the decision component 110 may identify the set of circuit components based on the system or circuit and the input and output metrics or other rules for the system. In some embodiments, the set of circuit components and the input and output metrics may be passed to the decision component 110 by a user.

At operation 220, the decision component 110 selects a subset of circuit components. The subset of circuit components is selected to generate an initial topology for the proposed circuit design. In some embodiments, the subset of circuit components is initially selected together. Once selected, the subset of circuit components may be positioned within a space designated for the proposed circuit design. In such instances, the subset of circuit components, positioned within the space for the proposed circuit design, are the initial topology. In some embodiments, the subset of circuit components is initially selected as a single circuit component, with the single circuit component being placed in a space designated for the proposed circuit design. In such instances, the single circuit component, placed within the space for the proposed circuit design, is the initial topology. The decision component 110 may use the operation 220 as an initial operation for building a plurality of topologies or proposed circuit designs.

The decision component 110 may select the subset of circuit components using a Markov decision process. The Markov decision process may be used as an initial step in a sequential decision making process to generate proposed circuit designs and topologies. In some embodiments, the decision component 110 selects the subset of circuit components based on user input, designating at least a portion of the subset of circuit components for inclusion in the proposed circuit design. In some embodiments, the decision component 110 selects the subset of circuit components based on one or more policies or models generated or trained to guide the decision component 110 or the Markov decision process.

Figure 3:
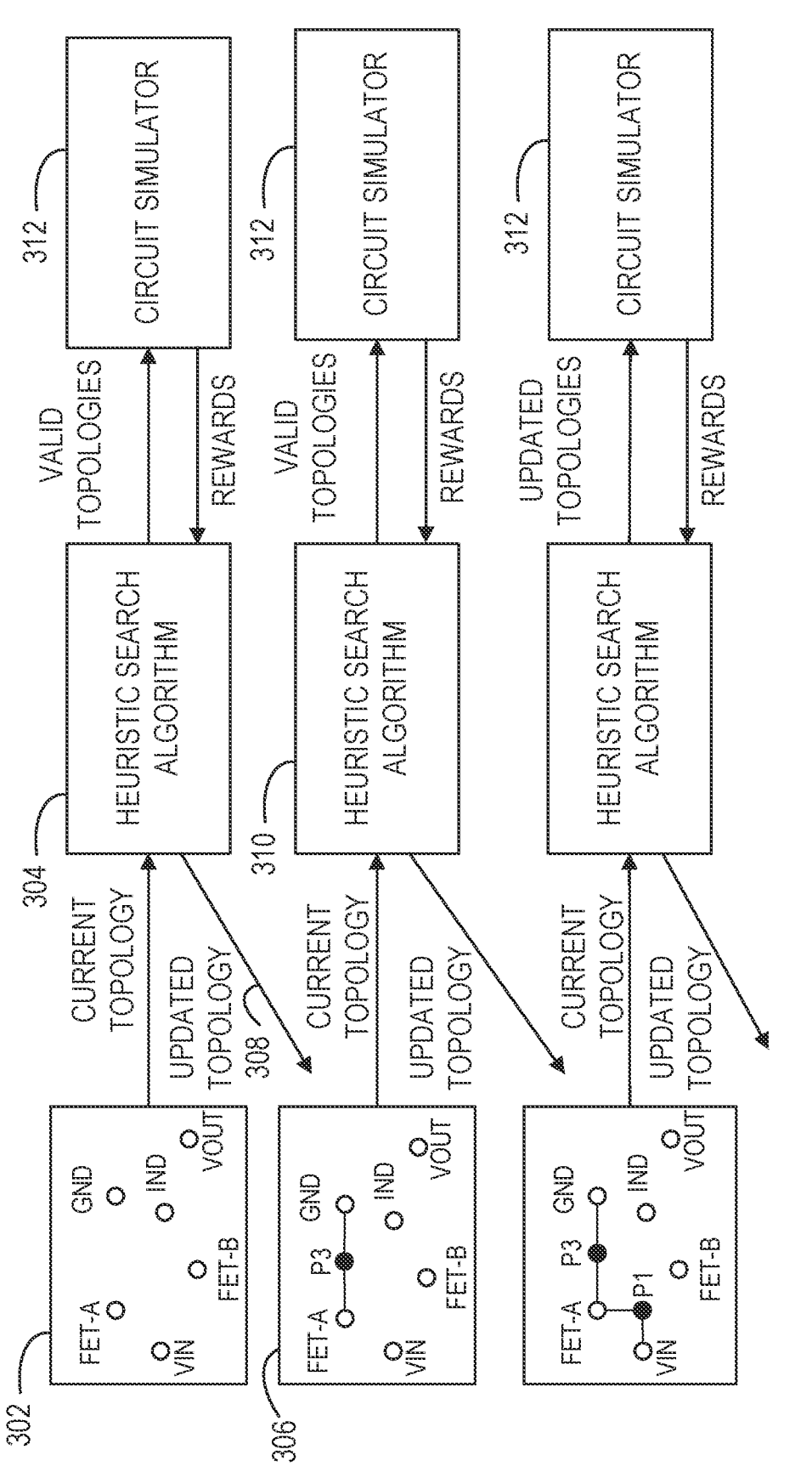
FIG. 3 depicts a flow diagram of a computer-implemented method for sequential decision-making for circuit design automation, according to at least one embodiment.

At operation 230, the planning component 120 iteratively generates a set of subsequent topologies. The planning component 120 generates the set of subsequent topologies using a heuristic search algorithm. In some embodiments, the set of subsequent topologies are iteratively generated based on the subset of circuit components and the initial topology. The planning component 120 may iteratively generate the set of subsequent topologies by adding the subset of circuit components and the set of component connections sequentially, in a predetermined order. In some embodiments, the planning component 120 cooperates with the decision component 110 to iteratively generate the set of subsequent topologies using the Markov decision process and the heuristic search algorithm. In such instances, the planning component 120 and the decision component 110 use the initial topology, selected by the Markov decision process as a current topology. As shown in FIG. 3, an initial topology 302 has been generated with a selected and placed subset of circuit components. The current topology is passed to the planning component 120 to identify, using the heuristic search algorithm, a subset of topologies flowing from the initial topology. As shown in FIG. 3, the initial topology 302 is used as a current topology and passed as an input to a heuristic search algorithm 304. The decision component 110 may select a next topology or subsequent topology from the subset of topologies flowing from the initial topology as a next action for the Markov decision process (e.g., placing a circuit component or a component connection). As shown in FIG. 3, a next topology 306 is selected and passed as updated topology 308. The next topology or subsequent topology (e.g., next topology 306) used by the decision component 110 may then be passed to the planning component 120 as a current topology and input to the heuristic search algorithm (e.g., heuristic search algorithm 310). This process of decision and search algorithm result may repeat until the planning component 120 has generated at least one complete circuit.

In some embodiments, the planning component 120 sequentially adds circuit components of the subset of circuit components to the proposed circuit design. The planning component 120 then sequentially adds a set of component connections of the sequentially added circuit components of the proposed circuit design. Each component connection may connect two or more circuit components of the sequentially added circuit components in the proposed circuit design. Each sequentially added circuit component or component connection may be selected and added by the decision component 110, based on potential topologies generated as part of a tree structure determined by the heuristic search algorithm.

In some embodiments, the planning component 120 sequentially adds the circuit components and the set of component connections using a Markov decision process implemented by the decision component 110. The planning component 120 may sequentially add the circuit components first using the Markov decision process. The Markov decision process may then be used to sequentially add the set of component connections second. In such embodiments, the set of component connections are added after the subset of circuit components have been added to the proposed circuit design or individual topologies of the set of subsequent topologies.

The planning component 120 may sequentially add the circuit components and component connections using the Markov decision process where a state of the process is a complete or incomplete circuit. An action for the process may be adding a circuit component or a component connection between two existing circuit components. At each time step in the Markov decision process, the planning component 120 may be in a state of a complete circuit or an incomplete circuit. At each state, the planning component 120 selects any action that is available in that state. In some embodiments, the planning component 120 initially selects an action, at each time step, of selecting and placing a circuit component. The planning component 120 may continue selecting actions of placing circuit components, in sequential time steps, until all of the subset of circuit components have been placed within the space allotted for the proposed circuit design. Once all the circuit components of the subset of circuit components have been suitably placed, the planning component 120 selects actions of placing a component connection between two or more circuit components in a series or sequence of time steps. The planning component 120 may continue to place component connections, placing one component connection at each time step, until all of the circuit components of the subset of circuit components are suitably connected to at least one other circuit component.

In some embodiments, after each action of the Markov process, the planning component 120 may move to a new state or perform another action. The planning component 120 may also assign a reward for each action. In some embodiments, the reward of a circuit in the Markov decision process is a function of an efficiency and a voltage output of the circuit. A probability of the planning component 120 moving to a new state may be influenced by one or more of the previous actions performed or a reward associated with those actions. In some instances, the probability of moving between states is conditionally independent of previous states and actions. In instances where the reward is based on the efficiency and the voltage output of the circuit, the probability of moving between states increases as the circuit nears completion relative to the input and output metrics or characteristics of the proposed circuit design.

Figure 4:
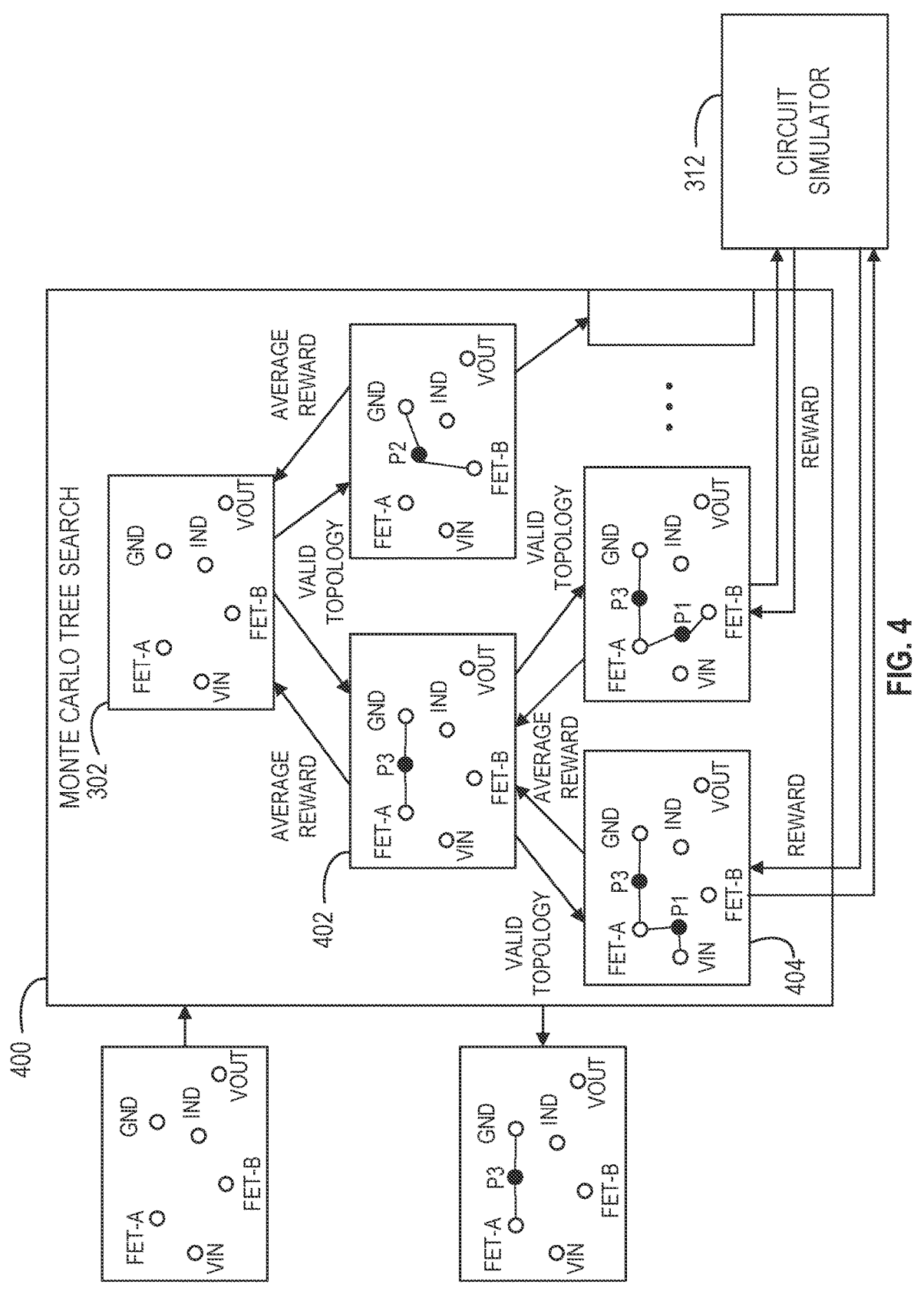
FIG. 4 depicts a flow diagram of a computer-implemented method for algorithmic search planning for circuit design automation, according to at least one embodiment.

In some embodiments, the planning component 120 iteratively generates the set of subsequent topologies using a Monte Carlo tree search algorithm as the heuristic search algorithm, as shown in FIG. 4. The planning component 120 uses the Monte Carlo tree search algorithm to iteratively generate topologies to identify high-performance circuits in a large topology space. Each topology generated by the Monte Carlo tree search algorithm may be generated based on a current topology generated by the Markov decision tree. The current topology acts as a starting point for the decision tree of a given iteratively generated subsequent topology. Given a starting point, the Monte Carlo tree search algorithm may determine potential topologies stemming from the starting point, and determine reward values for each leaf of the decision tree. The Monte Carlo tree search algorithm may also determine whether each leaf of the decision tree is a valid topology.

The planning component 120 may use a random policy in the Monte Carlo tree search algorithm. In some instances, the planning component 120 uses a default policy in the Monte Carlo tree search algorithm. The default policy may be trained using available offline circuit designs determined to be high-performance circuits. In some embodiments, the default policy uses offline topologies. The planning component 120 may use the offline topologies to determine a probability of adding a circuit component and a probability of adding a component connection.

In such embodiments, the planning component 120 generates a first subsequent topology 402, as shown in FIG. 4. The first subsequent topology may be generated based on the initial topology 302 and the Monte Carlo tree search algorithm 400. In some embodiments, the planning component 120 generates the first subsequent topology as a high reward topology. For example, the planning component 120 may use the Monte Carlo tree search algorithm to generate weights for each potential action, using the initial topology as a starting point. Each action, such as adding a circuit component or a component connection may be provided a weight. In some instances, differing weights are generated for each potential new node and each potential new edge. A node weight may be generated based on a number of valid circuits that contain a given node and a number of valid topologies possible using the initial topology as a starting point. An edge weight may be generated based on a number of valid circuits containing the given edge and the number of valid topologies.

The planning component 120 may iteratively generate the topologies by using the Markov decision process and the Monte Carlo tree search algorithm to first add nodes and then add edges to each circuit topology. Each circuit component may be understood as a node and each component connection between two or more components may be understood as an edge. The planning component 120 adds the nodes and edges in a predetermined order to ensure each topology of the set of subsequent topologies are in different branches of the search tree. Adding nodes and edges in a specified order may prevent a same topology occurring in different branches of the Monte Carlo tree or taking different sequences of actions using the Markov decision process to build the Monte Carlo tree. Preventing repetition of topologies may reduce tree size and increase search efficiency. For example, where components include an FET-A, an FET-B, an inductor, and a capacitor. The planning component 120 may first add the FET-A and then the FET-B in a consistent order to prevent repetition of a topology in different branches of the decision tree.

The planning component 120 then generates a second subsequent topology 404 based on the first subsequent topology 402 and the Monte Carlo tree search algorithm 400, as shown in FIG. 4. The second topology may be generated from available actions (e.g., placement of a new circuit component or component connection) given the first subsequent topology as a starting point. In some embodiments, the Monte Carlo tree search algorithm takes into consideration available circuit components, component connections, and in-device parameter configurations.

At operation 240, the simulator component 130 determines a set of valid topologies of the set of subsequent topologies. In some embodiments, the set of valid topologies are determined based on the subset of circuit components and a set of connections within the set of subsequent topologies. The simulator component 130 may use a circuit simulator in determining the set of valid topologies. In some embodiments, the circuit simulator is an analytical model. In some instances, the circuit simulator is a machine learning-based surrogate model. In some embodiments, operation 240 is performed by a circuit simulator 312 during performance of operation 230. In such instances, the circuit simulator 312 considers topologies generated by the Monte Carlo tree search, as shown in FIGS. 3 and 4.

At operation 250, the decision component 110 generates the proposed circuit design from the set of valid topologies. In some embodiments, the decision component 110 generates the proposed circuit design by selecting a circuit from the sets of valid topologies. The decision component 110 may select the circuit based on efficiency and voltage outputs of the circuit determined by the simulator component 130.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
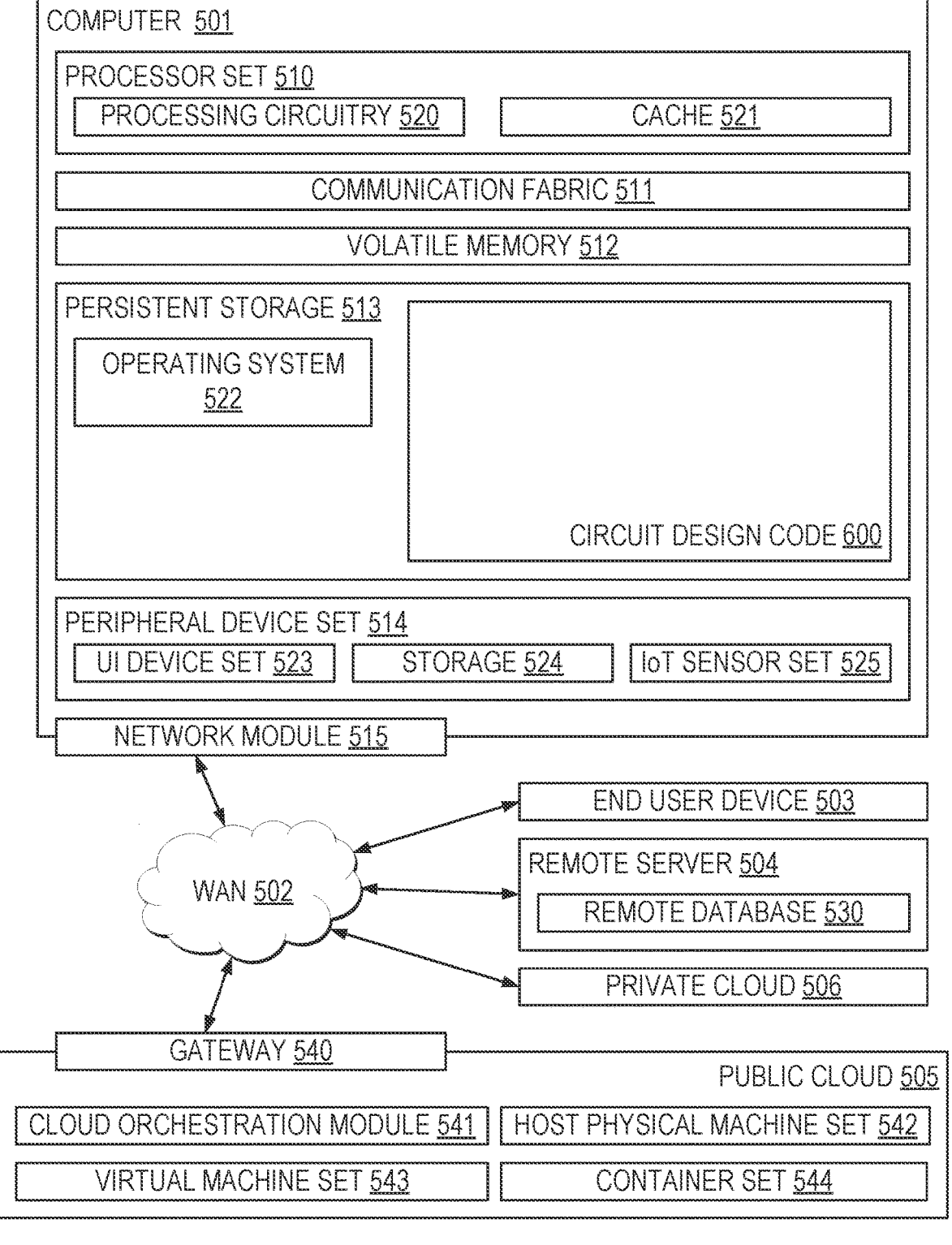
FIG. 5 depicts a schematic diagram of a computing environment for automated annotation scheduling for ground truth consistency, according to at least one embodiment.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and for circuit design automation. In some embodiments, the computing environment 500 may be the same as or an implementation of the computing environment 100.

Computing environment 500 contains an example of an environment for the execution of at least some of the computer code involved in performing the inventive methods, such as circuit design code 600. The circuit design code 600 may be a code-based implementation of the circuit design system 102. In addition to circuit design code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the circuit design code 600, as identified above), a peripheral device set 514 (including a user interface (UI) device set 523, storage 524, and an Internet of Things (IoT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 1. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the circuit design code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid state storage devices. The operating system 522 may take several forms, such as various known proprietary operating systems or open source Portable Operating System Interface-type operating systems that employ a kernel. The code included in the circuit design code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 522 and the circuit design code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a set of circuit components for a proposed circuit design;
selecting a subset of circuit components to generate an initial topology for the proposed circuit design;
iteratively generating, by a heuristic search algorithm, a set of subsequent topologies based on the subset of circuit components and the initial topology;
determining, by a circuit simulator, a set of valid topologies of the set of subsequent topologies based on the subset of circuit components and a set of connections within the set of subsequent topologies; and
generating the proposed circuit design from the set of valid topologies.

2. The method of claim 1, wherein iteratively generating the set of subsequent topologies further comprises:
sequentially adding circuit components of the subset of circuit components to the proposed circuit design; and
sequentially adding a set of component connections of the sequentially added circuit components of the proposed circuit design.

3. The method of claim 2, wherein the circuit components of the subset of circuit components and the set of component connections are sequentially added by a Markov decision process.

4. The method of claim 3, wherein the Markov decision process sequentially adds the circuit components of the subset of circuit components first, and the Markov decision process sequentially adds the set of component connections second, the set of component connections being added after the subset of circuit components have been added.

5. The method of claim 2, wherein the circuit components of the subset of circuit components and the set of component connections are sequentially added in a predetermined order.

6. The method of claim 1, wherein the heuristic search algorithm is a Monte Carlo tree search algorithm.

7. The method of claim 6, wherein iteratively generating the set of subsequent topologies further comprises:

generating a first subsequent topology based on the initial topology and the Monte Carlo tree search algorithm; and generating a second subsequent topology based on the first subsequent topology and the Monte Carlo tree search algorithm.

8. A system, comprising:

one or more processors; and a computer-readable storage medium, coupled to the one or more processors, storing program instructions that, when executed by the one or more processors, cause the one or more processors to perform operations comprising:

identifying a set of circuit components for a proposed circuit design;

selecting a subset of circuit components to generate an initial topology for the proposed circuit design;

iteratively generating, by a heuristic search algorithm, a set of subsequent topologies based on the subset of circuit components and the initial topology;

determining, by a circuit simulator, a set of valid topologies of the set of subsequent topologies based on the subset of circuit components and a set of connections within the set of subsequent topologies; and generating the proposed circuit design from the set of valid topologies.

9. The system of claim 8, wherein iteratively generating the set of subsequent topologies further comprises:

sequentially adding circuit components of the subset of circuit components to the proposed circuit design; and sequentially adding a set of component connections of the sequentially added circuit components of the proposed circuit design.

10. The system of claim 9, wherein the circuit components of the subset of circuit components and the set of component connections are sequentially added by a Markov decision process.

11. The system of claim 10, wherein the Markov decision process sequentially adds the circuit components of the subset of circuit components first, and the Markov decision process sequentially adds the set of component connections second, the set of component connections being added after the subset of circuit components have been added.

12. The system of claim 9, wherein the circuit components of the subset of circuit components and the set of component connections are sequentially added in a predetermined order.

13. The system of claim 8, wherein the heuristic search algorithm is a Monte Carlo tree search algorithm.

14. The system of claim 13, wherein iteratively generating the set of subsequent topologies further comprises:

generating a first subsequent topology based on the initial topology and the Monte Carlo tree search algorithm; and generating a second subsequent topology based on the first subsequent topology and the Monte Carlo tree search algorithm.

15. A computer program product comprising a computer readable storage medium having program instructions embodied therewith, the program instructions being executable by one or more processors to cause the one or more processors to perform operations comprising:

identifying a set of circuit components for a proposed circuit design;

selecting a subset of circuit components to generate an initial topology for the proposed circuit design;

iteratively generating, by a heuristic search algorithm, a set of subsequent topologies based on the subset of circuit components and the initial topology;

determining, by a circuit simulator, a set of valid topologies of the set of subsequent topologies based on the subset of circuit components and a set of connections within the set of subsequent topologies; and generating the proposed circuit design from the set of valid topologies.

16. The computer program product of claim 15, wherein iteratively generating the set of subsequent topologies further comprises:

sequentially adding circuit components of the subset of circuit components to the proposed circuit design; and sequentially adding a set of component connections of the sequentially added circuit components of the proposed circuit design.

17. The computer program product of claim 16, wherein the circuit components of the subset of circuit components and the set of component connections are sequentially added by a Markov decision process and wherein the Markov decision process sequentially adds the circuit components of the subset of circuit components first, and the Markov decision process sequentially adds the set of component connections second, the set of component connections being added after the subset of circuit components have been added.

18. The computer program product of claim 16, wherein the circuit components of the subset of circuit components and the set of component connections are sequentially added in a predetermined order.

19. The computer program product of claim 15, wherein the heuristic search algorithm is a Monte Carlo tree search algorithm.

20. The computer program product of claim 19, wherein iteratively generating the set of subsequent topologies further comprises:

generating a first subsequent topology based on the initial topology and the Monte Carlo tree search algorithm; and generating a second subsequent topology based on the first subsequent topology and the Monte Carlo tree search algorithm.

* * * * *